C. E. TIMSON.
ANIMAL MARKER.
APPLICATION FILED MAY 1, 1922.
1,436,119.
Patented Nov. 21, 1922.
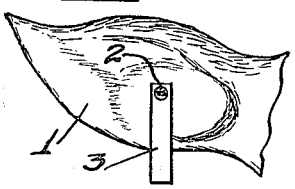
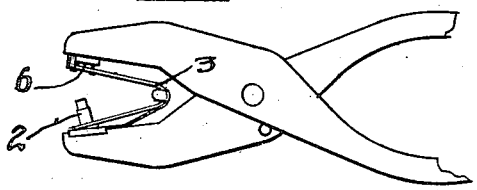
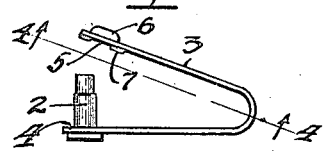
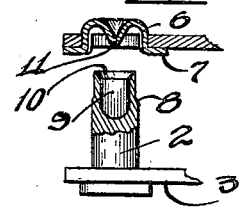
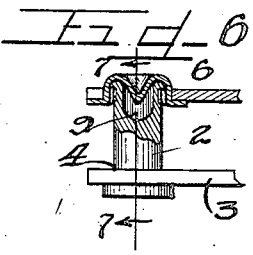
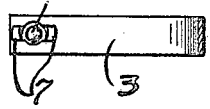
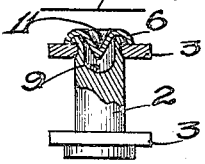
WITNESSES
J. W. Angell
INVENTOR
Charles E. Timson
by Atty.

Patented Nov. 21, 1922.

1,436,119

UNITED STATES PATENT OFFICE.

CHARLES E. TIMSON, OF CHICAGO, ILLINOIS.

ANIMAL MARKER.

Application filed May 1, 1922. Serial No. 557,631.

*To all whom it may concern:*

Be it known that I, CHARLES E. TIMSON, a citizen of the United States, and a resident of the city of Chicago, in the county of Cook and State of Illinois, have invented certain new and useful Improvements in an Animal Marker; and I do hereby declare that the following is a full, clear, and exact description of the same, reference being had to the accompanying drawings, and to the numerals of reference marked thereon, which form a part of this specification.

My invention relates to a means of sealing an animal marker in place so that removal will be practically impossible without mutilating the part of the animal to which my device is attached. Many forms of stock tags have been developed in the past, but they all are subject to removal and reuse, thereby permitting the substitution of an undesirable animal for one selected and marked.

An important use of my invention relates to the inspection of a herd for disease, etc.; the inspector using my tags may mark the accepted or rejected animals, secure in the knowledge that the tags cannot be removed from a valuable animal and put on a scrub.

It is an important object of my invention to provide a tag that will punch its own hole so that one operation perforates the animal's ear and places the tag in position.

It is a further object of my invention to provide a self-clinching tag that is permanently sealed in place so that no part of the clinched or spread pin end is accessible for removal and reapplication.

It will be evident that my sealing tag is equally suited for marking a large variety of animate as well as inanimate objects, such as hides, textiles, and other homogeneous substances, and that the advantages of a sealed tag are equally apparent for such purposes.

Other and further important objects of this invention will be apparent from the disclosures in the specification and the accompanying drawings.

The invention (in a preferred form) is illustrated in the drawings and hereinafter more fully described.

On the drawings:

Figure 1 shows the device of my invention applied to an animal's ear.

Figure 2 shows my tag in position between the jaws of a special tool by which it may be applied to an animal's ear.

Figure 3 is an enlarged view of the tag shown in Figure 1.

Figure 4 is a section on the line 4—4 of Figure 3.

Figure 5 is an enlarged fragmentary view of the tag showing the approximate relation of parts prior to actual closure.

Figure 6 is an enlarged fragmentary view showing the tag sealed or clinched together.

Figure 7 is a fragmentary view on the line 7—7 at right angles to the view shown in Fig. 6.

Figure 8 is an enlarged bottom view of the cap or seal which renders my device tamper proof.

As shown on the drawings:

The numeral 1 refers to an animal's ear through which the pin 2 is inserted and clinched over the clip 3 to hold the same securely in place. The clip is formed of a flat strip of any suitable material; if for permanent identification purposes, aluminum or galvanized iron would be suitable. This clip is punched out at 4 with a round hole at one end through which the pin 2 is forced up to its shoulder to get a secure fit. The other end is so punched at 5 that when the clip is bent so that the ends are approximately parallel the pin will register with the hole 5. The hole is so formed that a cap or seal 6 having lugs 7 can have the lugs inserted from the outside and clinched on the inside surface of the clip so that the cap will bear against the outside surface of the clip except at the lugs which bear on the inside surface thus securely retaining the cap. The inner diameter of the cap is slightly larger than the diameter of the hole for the pin so that the pin bears in the hole only on the portions not cut away for the lugs. The hole 5 is slightly countersunk to facilitate entry of the pin.

The pin 2 is slightly reduced in diameter at 8 to form a stop in connection with the countersink in the hole 5 and is bored out at 9 and internally beveled at 10 so that the pin will cut its own hole in the cartilage of the animal's ear, thus eliminating an extra operation when inserting my tags. The bore 9 is deep enough to contain the punched out piece so that it will not interfere with proper clinching of the pin. The cap is formed with an inverted cone point 11 which serves both as a centering guide when closing the tag and as a spreader for upsetting the head of the pin. Fig. 7 best shows the clinching action of this cone point in connection with the reversing curve of the cap.

In Fig. 2 I have shown my tag in position in a special tool for applying the same. With this tool the application of the tag is very simple, as the pin punches its own hole, and the cap clinches the pin, so that simple pressure on the handles of the tool completes all operations.

The cap is securely held in place both by its bearing on both sides of the clip and by the upset head of the pin which occupies the space between the cap and the clip, thus rendering the device tamper proof in that removal is practically impossible without cutting the animal's ear and removing the tag bodily. This necessarily prevents reuse of the tag so that if the tag is placed on an animal to show acceptance or rejection it cannot be switched to another animal to deceive the inspector or purchaser.

The tags may be made up of colored clips with an inspector's or owner's mark stamped on some part or serial numbers or a name may be stamped on the clip.

The cap or seal 6 may be stamped as indicated in Figure 1, so that said cap may in addition to its other functions comprise an official or distinguishing seal.

I am aware that numerous details of construction may be varied through a wide range without departing from the principles of this invention, and I therefore do not purpose limiting the patent granted otherwise than necessitated by the prior art.

I claim as my invention:

A sealing animal marker comprising a U-shaped clip having apertures in each leg thereof, a cap over one aperture, lugs on said cap extending through said aperture and bent to securely hold said cap in place, a pin recessed and beveled at one end, a shoulder on the other end of said pin adapted to form a stop when said pin is forced through the aperture in said clip on the end opposite the cap, and an inverted cone point on said cap adapted to center and spread the recessed end of said pin whereby the pin is clinched between said cap and said clip.

In testimony whereof I have hereunto subscribed my name in the presence of two subscribing witnesses.

CHARLES E. TIMSON.

Witnesses:
CARLTON HILL,
ERNEST K. HILL.